United States Patent [19]

Shimura

[11] Patent Number: 4,967,079
[45] Date of Patent: Oct. 30, 1990

[54] METHOD OF RECOGNIZING IRRADIATION FIELD

[75] Inventor: Kazuo Shimura, Kanagawa, Japan

[73] Assignee: Fuji Photo Film Co., Ltd., Kanagawa, Japan

[21] Appl. No.: 182,685

[22] Filed: Apr. 18, 1988

[30] Foreign Application Priority Data

Apr. 16, 1987 [JP] Japan ................................. 62-93633

[51] Int. Cl.$^5$ ............................................. H04N 5/32
[52] U.S. Cl. ............................... 250/327.2; 250/484.1
[58] Field of Search ........................ 250/327.2, 484.1; 382/22, 25

[56] References Cited

U.S. PATENT DOCUMENTS 4,685,143  8/1987  Choate ................................. 282/25

FOREIGN PATENT DOCUMENTS 0170270  2/1986  European Pat. Off. ......... 250/327.2

OTHER PUBLICATIONS

Pratt, W., Digital Images Processing, p. 523, J. Wiley (1978).

Primary Examiner—Janice A. Howell
Assistant Examiner—Richard Henig
Attorney, Agent, or Firm—Sughrue, Mion, Zinn, MacPeak & Seas

[57] ABSTRACT

A stimulable phosphor sheet bearing radiation image information recorded thereon by limitation of the irradiation field is exposed to stimulating rays and light emitted by the stimulable phosphor sheet upon stimulation is photoelectrically read out to obtain image signals representing the radiation image information borne by the stimulable phosphor sheet. The irradiation field is recognized by obtaining digital image data for a plurality of positions on the stimulable phorphor sheet from the image signals, detecting prospective edge points, which are considered to be edge portions of the irradiation field on the stimulable phosphor sheet, on the basis of the image data of positions radially outwardly arranged in a plurality of directions from a predetermined point inside the irradiation field, and recognizing as the irradiation field the region surrounded by the lines passing through the prospective edge points.

1 Claim, 5 Drawing Sheets (a)

(b)

METHOD OF RECOGNIZING IRRADIATION FIELD

BACKGROUND OF THE INVENTION

1. Field of the Invention

This invention relates to a method of recognizing an irradiation field on a stimulable phosphor sheet bearing radiation image information recorded thereon by limitation of the irradiation field when the stimulable phosphor sheet is exposed to stimulating rays and light emitted by the stimulable phosphor sheet upon stimulation is photoelectrically detected to obtain image signals representing the radiation image information born by the stimulable phosphor sheet.

2. Description of the Prior Art

When certain kinds of phosphors are exposed to a radiation such as X-rays, $\alpha$-rays, $\beta$-rays, $\gamma$-rays, cathode rays or ultraviolet rays, they store a part of the energy of the radiation. Then, when the phosphor which has been exposed to the radiation is exposed to stimulating rays such as visible light, light is emitted by the phosphor in proportion to the stored energy of the radiation. A phosphor exhibiting such properties is referred to as a stimulable phosphor.

As disclosed in U.S. Pat. No. 4,258,264 and Japanese Unexamined Patent Publication No. 56(1981)-11395, it has been proposed to use a stimulable phosphor in a radiation image recording and reproducing system. Specifically, a sheet provided with a layer of the stimulable phosphor (hereinafter referred to as a stimulable phosphor sheet) is first exposed to a radiation passing through an object such as the human body to have a radiation image of the object stored thereon, and is then exposed to stimulating rays such as a laser beam which cause the stimulable phosphor sheet to emit light in proportion to the stored radiation energy. The light emitted by the stimulable phosphor sheet upon stimulation thereof is photoelectrically detected and converted to an electric image signal, image processing is carried out on the electric image signal, and the radiation image of the object is reproduced as a visible image by use of the processed image signal on a recording medium such as a photographic film, a display device such as a cathode ray tube (CRT), or the like.

In the system, in order to avoid influence of fluctuation in the recording conditions and to obtain a visible image suitable for viewing for diagnostic purposes, it is preferred that the characteristics of the stored image information determined depending, for instance, on the state of the radiation image information recorded on the stimulable phosphor sheet, the image recording portion of the object such as the head, chest or abdomen, and/or the image recording method such as plain image recording or contrasted image recording be ascertained prior to output of a visible image and the read-out gain be adjusted on the stored image information ascertained and the scale factor be determined according to the contrast of the stored image information so that an optimal resolution can be obtained.

Ascertaining of the characteristics of the image information stored on the stimulable phosphor sheet prior to output of the visible image may be carried out by use of the method as disclosed in Japanese Unexamined Patent Publication No. 58(1983)-67240. In the disclosed method, a read-out operation for ascertaining the image information of a radiation image stored on the stimulable phosphor sheet (hereinafter referred to as the preliminary read-out) is carried out in advance by use of stimulating rays having stimulation energy of a level lower than the level of the stimulation energy of stimulating rays used in a read-out operation for obtaining a visible image (hereinafter referred to as the final read-out), thereby obtaining an outline of the characteristics of the stored image information, and the scale factor, the read-out gain and/or the signal processing conditions are determined on the basis of the information obtained by the preliminary read-out.

Various methods have been proposed for ascertaining the characteristics of the stored image information based on the preliminary read-out image signal obtained by the preliminary read-out or the final read-out image signal obtained by the final read-out. As one of such methods, it has heretofore been known to utilize a histogram of the image signals (image signal levels). With this method, the characteristics of the stored image information may be ascertained based on, for example, the maximum signal value, the minimum signal value, or a signal value at which the frequency is the maximum in the histogram. Therefore, it becomes possible to reproduce a visible image having an improved image quality, particularly a high diagnostic efficiency and accuracy, by adjusting the final read-out conditions such as the read-out gain and the scale factor and/or the image processing conditions such as the gradation processing conditions and the frequency response processing conditions based on the maximum signal value, the minimum signal value, a signal value at which the frequency is the maximum, or the like in the histogram.

On the other hand, in the course of radiation image recording, it is often desired that portions of the object not related to diagnosis or the like be prevented from exposure to a radiation. Further, when the object portions not related to diagnosis or the like are exposed to a radiation, the radiation is scattered by such portions to the portion related to diagnosis or the like, and the contrast and resolution are adversely affected by the scattered radiation. Therefore, in many cases, the irradiation field is limited to an area smaller than the overall recording region on the stimulable phosphor sheet when a radiation image is recorded.

However, when the characteristics of the image information stored on the stimulable phosphor sheet are ascertained based on the histogram of the image signals, the problem as described below arises. As shown in FIG. 2, when an irradiation field B is limited to an area smaller than an image recording region on a stimulable phosphor sheet 103 and the preliminary read-out or the final read-out is carried out over an area markedly larger than the irradiation field B, for example, over the overall image recording region on the stimulable phosphor sheet 103, the characteristics of the image information actually stored within the irradiation field B are ascertained incorrectly. Specifically, in the aforesaid case, since the image signals at regions outside of the irradiation field B are also included in the histogram, the histogram does not accurately represent the actual image information stored within the irradiation field B.

The applicants have proposed various methods of recognizing the irradiation field B as disclosed in, for example, U.S. Pat. No. 4,851,678. By recognizing the irradiation field according to such methods and carrying out the preliminary read-out only about the irradiation field, the problem described above can be overcome. However, with most of the proposed methods, recognition of the irradiation field is carried out assuming that the irradiation field is rectangular, and it is not always possible to accurately recognize the irradiation field in the case where it is of an irregular polygon or of a shape defined by a curve such as a circle, ellipse or the like.

SUMMARY OF THE INVENTION

The primary object of the present invention is to provide a method of recognizing an irradiation field, which accurately recognizes the irradiation field even though it is irregular in shape.

The present invention provides a method of recognizing an irradiation field on a stimulable phosphor sheet bearing radiation image information recorded thereon by limitation of the irradiation field when the stimulable phosphor sheet is exposed to stimulating rays and light emitted by the stimulable phosphor sheet upon stimulation is photoelectrically read out to obtain image signals representing the radiation image information borne by the stimulable phosphor sheet, the method comprising steps of obtaining digital image data for a plurality of positions on the stimulable phosphor sheet from the image signals, detecting prospective edge points, which are considered to be edge portions of the irradiation field on the stimulable phosphor sheet, on the basis of the image data of positions radially outwardly arranged in a plurality of directions from a predetermined point inside the irradiation field, and recognizing as the irradiation field the region surrounded by the lines passing through the prospective edge points.

In order to obtain digital image data for positions on the stimulable phosphor sheet, positions on the stimulable phosphor sheet must be first defined. Positions of the sheet may be defined with one picture element being considered to represent one position or may be defined with three to five picture elements arranged in a predetermined direction being considered to represent one position.

In the case that the one picture element is considered to represent one position, by the term "digital image data for a given position" as used herein is meant a digitized image signal for the picture element corresponding to the position, while in the case that three to five picture elements are considered to represent one position, by the term "digital image data for a given position" is meant a digitized image signal determined on the basis of the image signals for the picture elements included in the position, e.g., digital image information obtained by averaging the image signals for the picture elements included in the position. To define positions on the stimulable phosphor sheet in the latter manner is to pre-processing, by linear or nonlinear filtering, the image signal for each picture element obtained by the read-out process, e.g., to one-dimensionally smoothing the image signals for the respective picture element every three to five lines.

The prospective edge points may be detected, for example, by differentiation processing of digitized image signals. The differentiation processing may be one-dimensional differentiation of first or higher order, or two-dimensional differentiation of first or higher order. For a discretely sampled image, differentiation is equivalent to calculation of differences between image signals present in the vicinity.

As described above, the value of the digital image data is proportional to the energy of the radiation impinging upon the stimulable phosphor sheet. Accordingly, the quantum level of the image data for the region outside the irradiation field is generally low, while the quantum level of the image data for the region inside the irradiation field is generally high. Accordingly, the difference value between the image signals at a portion where the contour of the irradiation field is present (edge portion) becomes substantially larger than the difference values at the other portions, and the prospective edge points can be detected on the basis of the difference value.

Said differentiation processing is carried out from a predetermined point inside the irradiation field radially outwardly toward the outer edge of the stimulable phosphor sheet. Accordingly, a prospective edge point can be necessarily obtained by one differentiation processing irrespective of the shape of the irradiation field, and it thus becomes possible to obtain a number of prospective edge points with a high efficiency. The line (a straight line or a curve) joining a number of prospective edge points thus obtained represents the contour of the irradiation field. Such a line may be obtained on the basis of the prospective edge points by a known method. The region surrounded by the line may be recognized as the irradiation field.

In order to detect the prospective edge points from the image data of the positions radially outwardly arranged in a plurality of directions from a predetermined point inside the irradiation field, a technique utilizing pattern matching, a method in which line application is carried out and the edge portion of the irradiation field is determined on the basis of the inclination of the line, or the like can be used besides the differentiation processing.

DESCRIPTION OF THE PREFERRED EMBODIMENTS

The present invention will hereinbelow be described in further detail with reference to the accompanying drawings.

Figure 1:
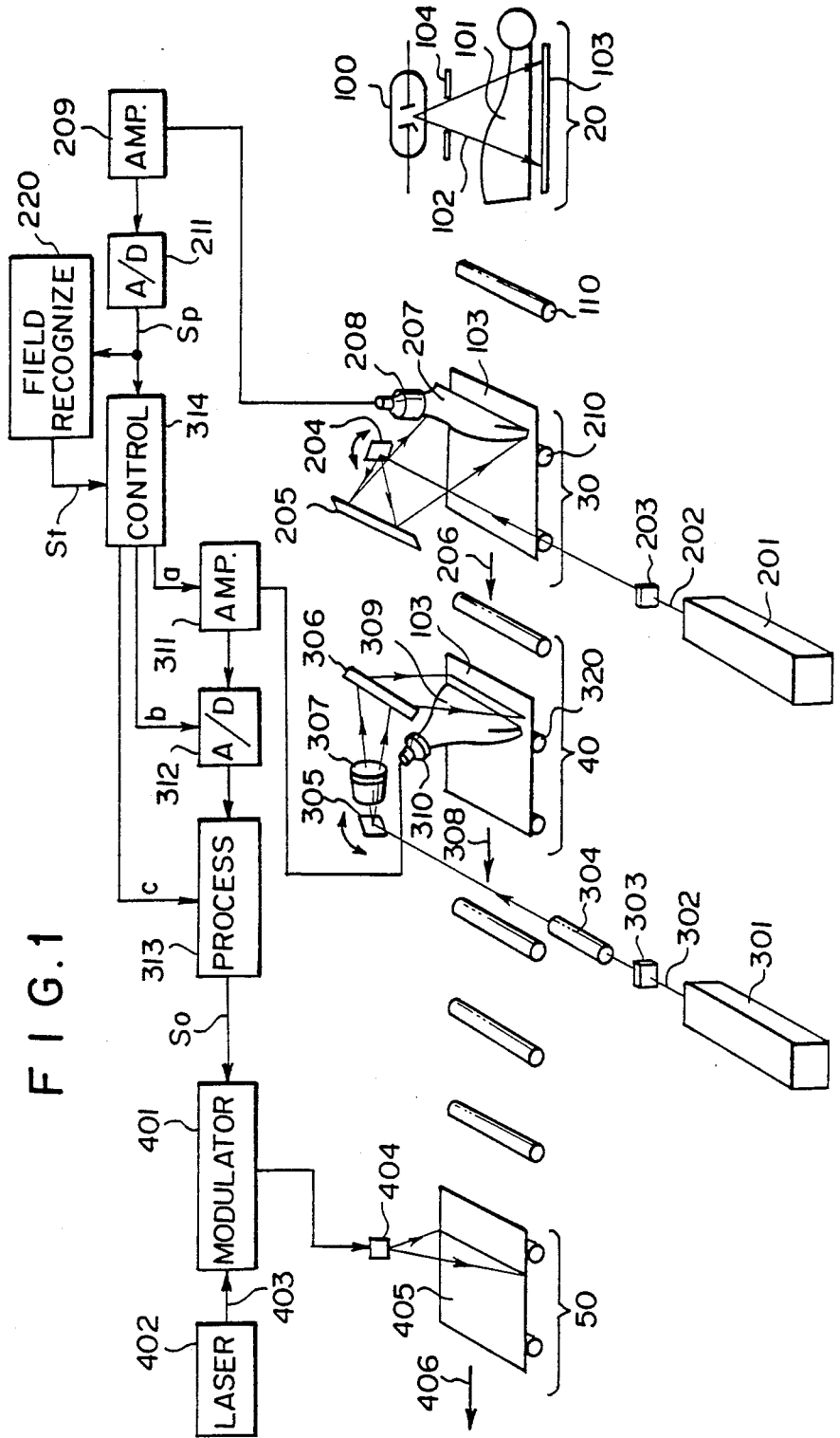
FIG. 1 is a schematic view showing the configuration of a radiation image recording and reproducing system wherein an embodiment of the method of recognizing an irradiation field in accordance with the present invention is employed.

Referring to FIG. 1, a radiation image recording and reproducing system basically comprises a radiation image recording section 20, a preliminary read-out section 30, a final read-out section 40, and an image reproducing section 50. At the radiation image recording section 20, radiation 102 is emitted by a radiation source 100 constituted by an X-ray tube or the like toward an object 101. A stimulable phosphor sheet 103 for storing radiation energy thereon is placed at the position exposed to the radiation 102 passing through the object 101, and a radiation image of the object 101 is stored on the stimulable phosphor sheet 103. An irradiation field stop 104 for limiting the irradiation field of the radiation 102 is disposed between the radiation source 100 and the object 101, and the irradiation field is limited when necessary.

The stimulable phosphor sheet 103 carrying the radiation image of the object 101 stored thereon is sent to the preliminary read-out section 30 by a sheet conveyance means 110 constituted by a conveyor roller or the like. At the preliminary read-out section 30, a laser beam 202 emanated by a laser beam source 201 is first passed through a filter 203 for cutting off light having a wavelength within a range identical with the range of the wavelength of the light emitted by the stimulable phosphor sheet 103 upon stimulation thereof by the laser beam 202. Then, the laser beam 202 is one-dimensionally deflected by a light deflector 204 such as a galvanometer mirror and directed onto the stimulable phosphor sheet 103 by a plane reflection mirror 205. The laser beam source 201 is selected so that the laser beam 202 produced thereby has a wavelength distribution different from and far apart from the wavelength distribution of the light emitted by the stimulable phosphor sheet 103 upon stimulation thereof. While the laser beam 202 impinges upon the stimulable phosphor sheet 103, the stimulable phosphor sheet 103 is moved in the direction as indicated by the arrow 206 (i.e. in the sub-scanning direction) by a sheet conveyance means 210 constituted by conveyor rollers or the like, and thus the overall surface of the stimulable phosphor sheet 103 is exposed to and scanned by the laser beam 202. The power of the laser beam source 201, the beam diameter of the laser beam 202, the scanning speed of the laser beam 202, and the moving speed of the stimulable phosphor sheet 103 are selected so that the level of the stimulation energy of the laser beam 202 for preliminary read-out is lower than the level of the stimulation energy of the laser beam for the final read-out carried out at the final read-out section 40.

When exposed to the laser beam 202 as mentioned above, the stimulable phosphor sheet 103 emits light in proportion to the radiation energy stored thereon, and the emitted light enters a light guide member 207. The light is guided inside of the light guide member 207 through total reflection, projected from a light output face of the light guide member 207 and received by a photodetector 208 constituted by a photomultiplier or the like. The light receiving face of the photodetector 208 is closely contacted with a filter for transmitting only light having the wavelength distribution of the light emitted by the stimulable phosphor sheet 103 and cutting off the light having the wavelength distribution of the stimulating rays, so that the photodetector 208 can detect only the light emitted by the stimulable phosphor sheet 103 upon stimulation thereof. The light detected by the photodetector 208 is converted into electric signals carrying the image information stored on the stimulable phosphor sheet 103, and amplified by an amplifier 209. The signals generated by the amplifier 209 are digitized by an A/D converter 211, and sent as preliminary read-out image signals Sp to a final read-out control circuit 314 at the final read-out section 40. On the basis of the characteristics of the stored image information ascertained from the preliminary read-out image signals Sp, the final read-out control circuit 314 calculates a read-out gain setting value (a), a scale factor setting value (b), and an image processing condition setting value (c). The preliminary read-out image signals Sp are also sent to an irradiation field recognition circuit 220 which will be described in detail later.

After the preliminary read-out is finished, the stimulable phosphor sheet 103 is sent to the final read-out section 40. At this section, a laser beam 302 produced by a laser beam source 301 is first passed through a filter 303 for cutting off light having a wavelength within the range identical with the range of the wavelength of the light emitted by the stimulable phosphor sheet 103 upon stimulation thereof by the laser beam 302. Then, the beam diameter of the laser beam 302 is carefully adjusted by a beam expander 304. The laser beam 302 is then deflected by a light deflector 305 formed of a galvanometer mirror or the like, and is made to impinge upon the stimulable phosphor sheet 103 by a plane reflection mirror 306. Between the light deflector 305 and the plane reflection mirror 306 is disposed an $f\theta$ lens 307 for maintaining the beam diameter of the laser beam 302 uniform in the course of the scanning of the laser beam 302 on the stimulable phosphor sheet 103. While the laser beam 302 impinges upon the stimulable phosphor sheet 103, the stimulable phosphor sheet 103 is moved in the direction as indicated by the arrow 308 (i.e. in the sub-scanning direction) by a sheet conveyance means 320 constituted by conveyor rollers or the like and, consequently, the overall area of the stimulable phosphor sheet 103 is exposed to and scanned by the laser beam 302. Upon exposure to the laser beam 302, the stimulable phosphor sheet 103 emits light in proportion to the radiation energy stored thereon, and the light emitted enters a light guide member 309. The light emitted by the stimulable phosphor sheet 103 is guided inside of the light guide member 309 through total reflection, projected from the light output face of the light guide member 309 and received by a photodetector 310 constituted by a photomultiplier or the like. The light receiving face of the photodetector 310 is closely contacted with a filter for selectively transmitting only the light having the wavelength distribution of the light emitted by the stimulable phosphor sheet 103, so that the photodetector 310 can detect only the light emitted thereby.

The output of the photodetector 310 photoelectrically detecting the light emission representing the radiation image stored on the stimulable phosphor sheet 103 is amplified to an appropriate level by an amplifier 311 the read-out gain of which has been adjusted by the read-out gain setting value (a) calculated by the control circuit 314. The amplified electric signals are fed to an A/D converter 312 which converts the electric signals into digital signals by use of a scale factor which has been adjusted by the scale factor setting value (b) to suit the width of signal fluctuation. The digital signals, i.e. the final read-out image signals thus obtained are fed to a signal processing circuit 313, in which they are subjected to signal processing (image processing) based on the image processing condition setting value (c) so as to obtain a visible radiation image suitable for viewing, particularly for diagnostic purposes, and are output as image signals (final read-out image signals) So.

The final read-out image signals So generated by the signal processing circuit 313 are fed to a light modulator 401 at the image reproducing section 50. At the image reproducing section 50, a laser beam 403 produced by a reproducing laser beam source 402 is modulated by the light modulator 401 on the basis of the final read-out image signals So received from the signal processing circuit 313, and is made to impinge upon a photosensitive material 405 such as a photographic film by a scanning mirror 404 for scanning the photosensitive material 405 by the laser beam 403. At this time, the photosensitive material 405 is moved normal to the aforesaid scanning direction, i.e. in the direction as indicated by the arrow 406. Accordingly, the radiation image represented by the final read-out image signals So is recorded on the photosensitive material 405. For reproducing the radiation image, it is possible to use any other appropriate method such as the aforesaid displaying on a CRT.

Figure 2:
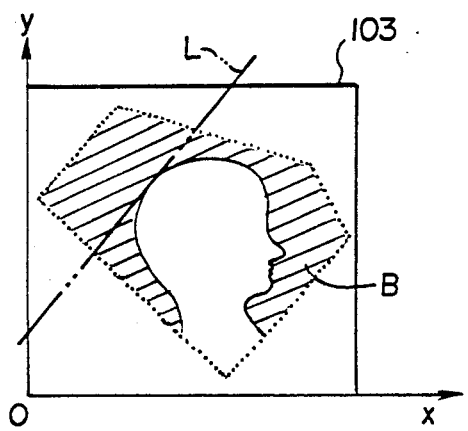
FIG. 2 is a view for illustrating an example of the irradiation field.
Figure 5:
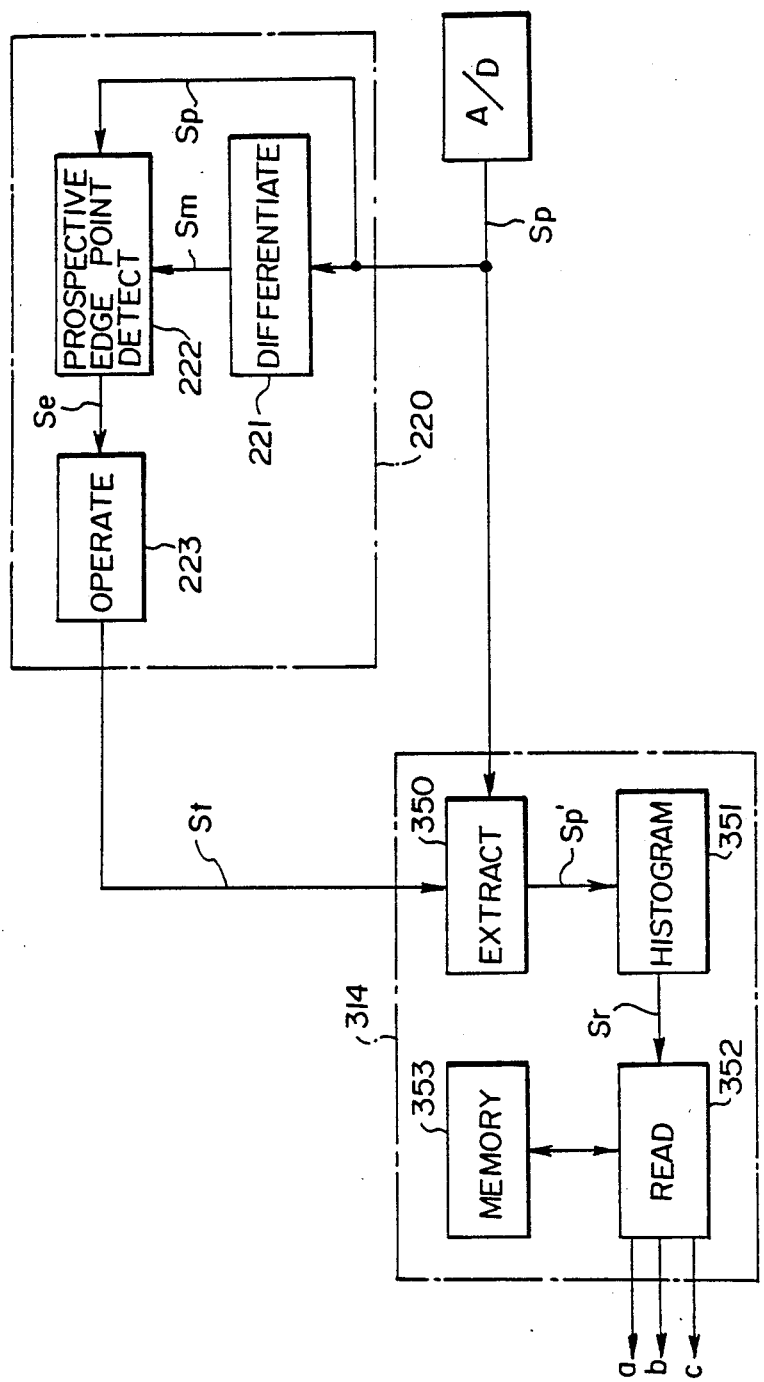
FIG. 5 is a block diagram showing in detail a part of the radiation image recording and reproducing system shown in FIG. 1.

A technique of accurately adjusting the read-out gain setting value (a), the scale factor setting value (b), and the image processing condition setting value (c) even though the irradiation field B on the stimulable phosphor sheet 103 is limited as shown in FIG. 2 will hereinbelow be described with reference to FIG. 5. As shown in FIG. 5, the control circuit 314 comprises a signal extracting section 350, a histogram analysis section 351, a read section 352, and a memory section 353. The aforesaid preliminary read-out image signals Sp are sent to the signal extracting section 350 which extracts preliminary read-out image signals Sp' only within a region specified as will be described later. The preliminary read-out image signals Sp' are sent from the signal extracting section 350 to the histogram analysis section 351. The histogram analysis section 351 creates a histogram of the preliminary read-out image signals Sp', calculates the maximum value, the minimum value, the signal value at which the frequency is the maximum in the histogram, or the like, and sends a signal Sr representing the calculated values to the read section 352. The memory section 353 stores the read-out gain setting value (a), the scale factor setting value (b), and the image processing condition setting value (c) suitable for the aforesaid maximum value, the minimum value, the signal value at which the frequency is the maximum or the like. The read section 352 reads the setting values (a), (b) and (c) suitable for the signal Sr from the memory section 353, and sends them respectively to the amplifier 311, the A/D converter 312, and the signal processing circuit 313.

Figure 3:
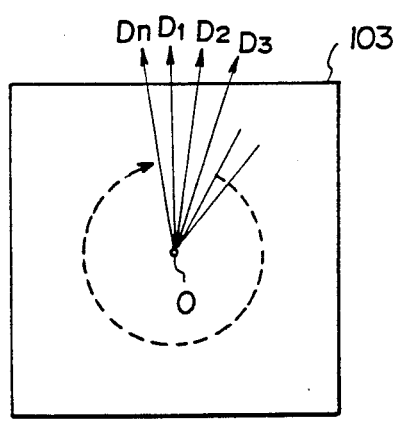
FIG. 3 is a view for illustrating the directions in which the differentiation processings are to be accomplished.
Figure 4:
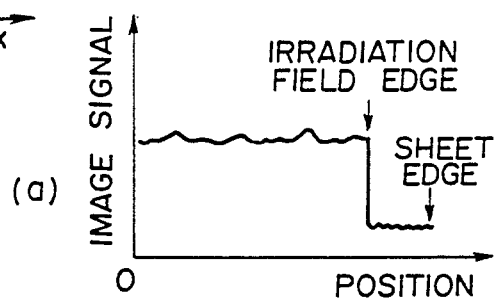
FIG. 4 shows graphs showing the image signal distribution and the image signal difference distribution.
Figure 4:
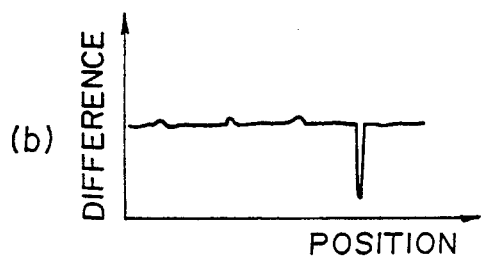

Signal extraction by the signal extracting section 350 will now be described below. The irradiation field recognition circuit 220 is composed of a differentiation processing section 221, a prospective edge point signal detecting section 222, and an operating section 223. In the irradiation field recognition circuit 220, the preliminary read-out image signals Sp are fed to the differentiation processing section 221 and the prospective edge point signal detecting section 222. The differentiation processing section 221 differentiates the digitized preliminary read-out image signals Sp first in the direction D1 shown in FIG. 3. Then the differentiation processing section 221 accomplishes similar differentiation processing in the directions D2, D3 ... Dn. The directions D1 to Dn are directed radially outwardly toward the outer edge of the stimulable phosphor sheet 103 from the center O thereof, and are angularly set at regular intervals in this particular embodiment. The number of the directions D1 to Dn may be about 64 in the case that the size of the stimulable phosphor sheet 103 is 256 mm×192 mm, for instance. By this differentiation processings, the aforesaid differences are obtained. Information Sm on the differences is sent to the prospective edge point signal detecting section 222. The prospective edge point signal detecting section 222 obtains the prospective edge points, which are considered to be edge portions of the irradiation field B on the stimulable phosphor sheet 103 from the information Sm on the differences. That is, since the level of the image signals for the region inside the irradiation field B is markedly higher than the level of the image signals for the region outside the irradiation field B, the values of the preliminary read-out image signals Sp in a given direction Di distribute as shown in FIG. 4(a), and accordingly, the differences specifically change at the edge portion of the irradiation field as shown in FIG. 4(b). Then the prospective edge point signal detecting section 222 obtains the prospective edge points, for example, by detecting the position at which the absolute value of the difference becomes maximum, all the positions at which the difference exceeds a predetermined threshold value, or a position nearest to (or farthest from) the center O of the sheet 103 among the positions at which the difference exceeds the predetermined threshold value. Thereafter, the prospective edge point signal detecting section 222 extracts the preliminary read-out image signal Sp for the prospective edge points thus obtained and obtains the picture element positions corresponding to the extracted preliminary read-out image signals Sp, and sends information Se on the picture element positions to the operating section 223. Almost all of the preliminary read-out image signals Sp extracted in the manner described above become the image signals representing the edge portions of the irradiation field B on the stimulable phosphor sheet 103 as shown in FIG. 2, i,e., the prospective edge point signals. In this particular embodiment, the picture element positions are expressed with an x-y orthogonal coordinate system on the stimulable phosphor sheet 103 as shown in FIG. 2.

The line joining the prospective edge points thus obtained is the contour of the irradiation field as described above. Though the line joining the prospective edge points may be obtained in various manners (for example, by smoothing the prospective edge points and joining points lingering after the smoothing, or by locally applying the least squares method to obtain a plurality of straight lines and connecting the lines, or by applying spline curves), the operating section 223 in this particular embodiment is arranged to obtain a plurality of straight lines passing through the prospective edge points by use of Hough conversion. This will be described in detail, hereinbelow.

Figure 6:
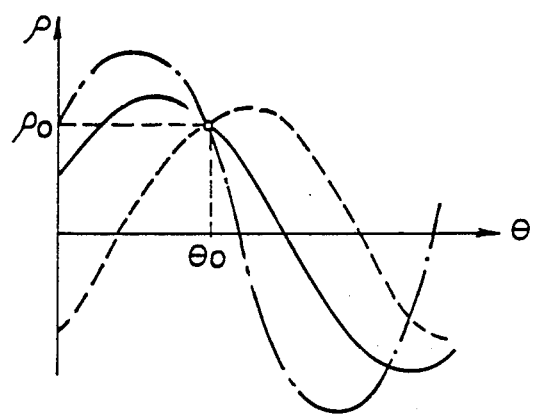
FIG. 6 is a view for illustrating a method of detecting the lines passing through the prospective edge points.

The operating section 223 obtains curves represented by formula $$\rho = x_o \cos\theta + y_o \sin\theta$$

for the respective prospective edge points wherein $x_o$ and $y_o$ respectively represent the x coordinate (constant) and the y coordinate (constant) of a given prospective edge point (the picture element position represented by the information Se) when the positions of the prospective edge points are expressed with an x-y orthogonal coordinate system. These curves are as shown in FIG. 6 and the number of the curves is equal to the number of the prospective edge points.

Then the operating section 223 obtains points ($\rho_o$, $\theta_o$) at which more than a predetermined number Q of the curves intersect each other. Practically, numbers of the curves cannot intersect each other strictly at one point due to errors in the detected coordinates ($x_o$, $y_o$) of the prospective edge points and the like. Accordingly, when a plurality of intersections of a pair of the curves exist spaced from each other within a predetermined very small distance, the center of such intersections is regarded as the intersections ($\rho_o$, $\theta_o$).

Then the operating section 223 obtains straight lines defined by formula $$\rho_o = x \cos \theta_o + y \sin \theta_o$$

in the orthogonal coordinate system on the basis of the intersections of the curves thus obtained. The straight lines pass a plurality of the prospective edge points ($x_o$, $y_o$). Points corresponding to the edge portion of a bone image at which the image density can abruptly change sometimes can be detected as the prospective edge point. In this case, a straight line L (FIG. 2) joining true prospective edge points and the point on the edge portion of the bone image which is mistaken for the prospective edge point of the irradiation field can be obtained. However, this can be obtained by setting the predetermined number Q to be sufficiently large (e.g., 20). That is, only straight lines passing through a number of the prospective edge points can be obtained.

Figure 7:
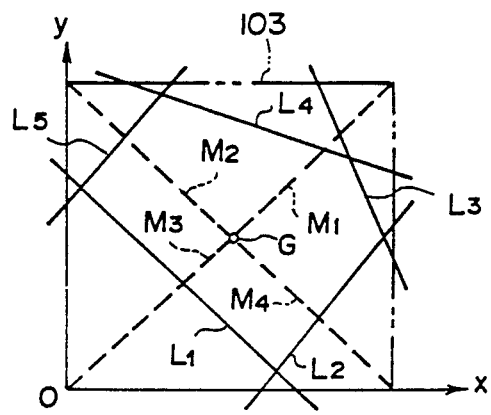
FIG. 7 is a view for illustrating a method of extracting the region surrounded by the lines passing through the prospective edge points.

The relevant straight lines are as shown in FIG. 7 when the prospective edge points are distributed as shown in FIG. 2. Then the operating section 223 obtains the region surrounded by the straight lines L1, L2, L3 . . . Ln thus obtained and recognize it as the irradiation field B. Recognition of the region surrounded by the straight lines is effected in the following manner, for example. Straight lines M1, M2, M3 . . . Mm (FIG. 7) joining the respective corners of the stimulable phosphor sheet 103 and the center G of the same (When the stimulable phosphor sheet 103 is rectangular, the straight lines are four in number.) have been stored in a memory, and then whether there is an intersection of the lines M1 to Mm and a given one of the lines L1 to Ln is detected. When there is an intersection, the part of the stimulable phosphor sheet 103 on the side of the given one of the lines L1 to Ln including the corresponding corner of the small region is cut. When this operation is carried out for all the lines L1 to Ln, the region surrounded by the lines L1 to Ln will remain.

The operating section 223 sends information St on the irradiation field B thus recognized to the signal extracting section 350 of the control circuit 314. The signal extracting section 350 extracts only the signals within the region represented by the information St from the preliminary read-out image signals Sp, and sends the extracted signals to the histogram analysis section 351. Therefore, histogram analysis in the histogram analysis section 351 is carried out only for the region actually exposed to the radiation, or approximately for said region. As a result, the aforesaid setting values (a), (b) and (c) become optimal for the image information actually stored on the stimulable phosphor sheet 103.

In the embodiment described above, the differentiation processing is started from the center 0 of the stimulable phosphor sheet, but the differentiation processing may be started from any point so long as it is inside the irradiation field. For example, when the irradiation field is very narrow, the center of the sheet can be outside the irradiation field. In such a case, it is preferred that the differentiation processing be started from another point which can be considered to be inherently inside the irradiation field, e.g., the center of density gravity, the maximum density point, the center of density gravity on the higher density side obtained by binary-coding the density or the like.

Figure 8:
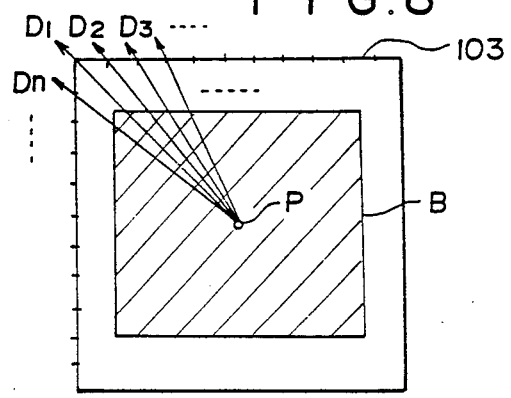
FIGS. 8, 9, 10 and 11 are views for illustrating other methods of setting the directions in which the differentiation processings are to be accomplished.

Further, though, in the embodiment described above, the directions D1 to Dn in which the differentiation processings are to be accomplished are equiangularly set about the center 0 of the stimulable phosphor sheet, it is not necessary. For example, the directions D1 to Dn in which the differentiation processings are to be accomplished may be set as straight lines joining a predetermined point P inside the irradiation field and a plurality of points set along the outer edge of the sheet at regular intervals as shown in FIG. 8.

Figure 9:
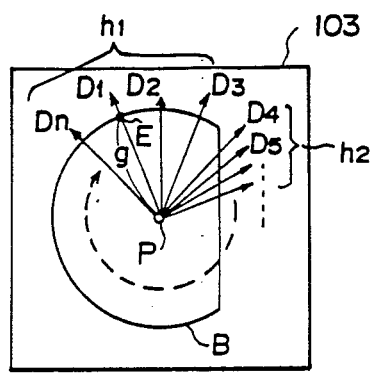

Further, as shown in FIG. 9, it is possible to set the directions D1 to Dn at relatively wide intervals where the distance g between the predetermined point P and the prospective edge point E does not change substantially (the area indicated at h1) and to set them at relatively narrow intervals where the distance g substantially changes (the area indicated at h2).

Generally the preliminary read-out is relatively roughly carried out as compared with the final read-out. Said differentiation processing may be accomplished on the image data obtained by the relatively rough read-out as they are, but may be accomplished on the more detailed image data obtained by complementing the image data obtained by the relatively rough read-out. Further, the differentiation processing may be accomplished on image data obtained by averaging the image signals for a plurality of picture elements included in the position.

Figure 10:
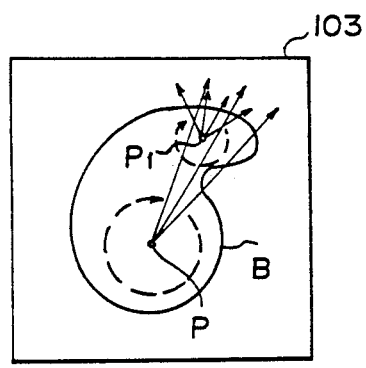
Figure 11:
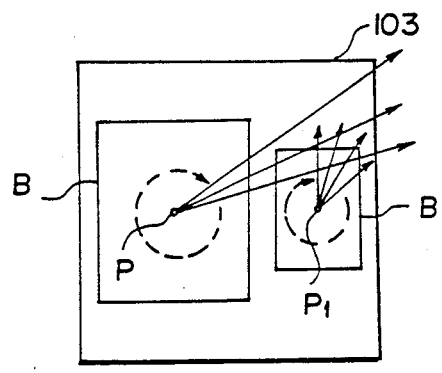

When the shape of the irradiation field B to be recognized is as shown in FIG. 2, only one prospective edge point is obtained for each differentiation processing. However, when the shape of the irradiation field B to be recognized is as shown in FIG. 10 or 11, a plurality of prospective edge points can be sometimes obtained for one differentiation processing. Even in such cases, all the prospective edge points can be detected by adopting as the prospective edge points all the points at which the relevant differences exceeds the predetermined value. Thus, even the irradiation field having a complicated shape can be correctly recognized. On the other hand, when the prospective edge point signal detecting section 222 is arranged to detect only one prospective edge point for each differentiation processing, a number of prospective edge points can be precisely detected by setting another point P1 in the vicinity of a point at which the difference exceeds the predetermined value and which was not nevertheless adopted as the prospective edge points, and by accomplishing the similar differentiation processings from the point P1.

In the case where the irradiation field on the stimulable phosphor sheet 103 is not limited, the information St output from the operating section 223 represents the overall region of the stimulable phosphor sheet 103. Therefore, also in this case, the setting values (a), (b) and (c) can be adjusted to appropriate values. However, in order to prevent processing in the irradiation field recognition circuit 220 from being carried out unnecessarily in this case, a switch for turning on and off the operation of the irradiation field recognition circuit 220 should preferably be provided, the signal extracting section 350 should preferably be constituted to pass all of the preliminary read-out image signals Sp therethrough when the irradiation field recognition circuit 220 is off. With this configuration, in the case where it is known in advance that image read-out is carried out from the stimulable phosphor sheet 103 having a radiation image stored thereon without limiting the irradiation field, all of the preliminary read-out image signals Sp can be quickly fed to the histogram analysis section 351 by, for example, manual operation.

The read-out region at the final read-out section 40 may be controlled based on the signal St which represents the irradiation field B and which is generated by the irradiation field recognition circuit 220. In this case, the final readout is carried out only for the irradiation field B on the stimulable phosphor sheet 103, and the read-out processing speed becomes high.

In the radiation image recording and reproducing system shown in FIG. 1, the preliminary read-out section and the final read-out section are disposed independently. However, as disclosed in, for example, Japanese Unexamined Patent Publication No. 58(1983)-67242, a single read-out system may be used for the preliminary read-out and the final read-out. In this case, after the preliminary read-out is finished, the stimulable phosphor sheet is returned to the read-out system by a sheet conveyance means and then the final read-out is carried out. In the preliminary read-out step, the stimulation energy of the stimulating rays is adjusted by a stimulating ray energy adjusting means to be lower than the stimulation energy of the stimulating rays used in the final read-out. The present invention is also applicable to such a case.

Though, in the embodiment described above, the irradiation field is recognized on the basis of the preliminary read-out image information, the present invention may be applied to the system in which the irradiation field is recognized on the basis of the final read-out image information. In the latter case, the irradiation field recognized can be utilized for determining the image processing condition setting value (c) from the final read-out image information, for example.

I claim:

1. A method of recognizing an irradiation field on a stimulable phosphor sheet bearing radiation image information recorded thereon by limitation of the irradiation field when the stimulable phosphor sheet is exposed to stimulating rays and light emitted by the stimulable phosphor sheet upon stimulation is photoelectrically read out to obtain image signals representing the radiation image information borne by the stimulable phosphor sheet, the method comprising steps of:

obtaining digital image data for a plurality of positions on the stimulable phosphor sheet from the image signals;

detecting prospective edge points, which are considered to be edge portions of the irradiation field on the stimulable phosphor sheet, on the basis of the image data of positions radially outwardly arranged in a plurality of directions from a predetermined point inside the irradiation field, wherein said predetermined point is not one of said prospective edge points; and 'recognizing as the irradiation field the region surrounded by the lines passing through the prospective edge points.

* * * * *